(12) United States Patent
Vasudevan

(10) Patent No.: US 9,331,935 B2
(45) Date of Patent: May 3, 2016

(54) NETWORK DEVICE SELECTION

(75) Inventor: Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 13/995,241

(22) PCT Filed: Nov. 22, 2011

(86) PCT No.: PCT/US2011/061876
§ 371 (c)(1),
(2), (4) Date: Jun. 18, 2013

(87) PCT Pub. No.: WO2013/077860
PCT Pub. Date: May 30, 2013

(65) Prior Publication Data
US 2014/0161122 A1    Jun. 12, 2014

(51) Int. Cl.
*H04L 12/775*    (2013.01)
*H04L 12/931*    (2013.01)
*H04L 12/947*    (2013.01)

(52) U.S. Cl.
CPC ............. *H04L 45/58* (2013.01); *H04L 49/25* (2013.01); *H04L 49/351* (2013.01); *H04L 49/70* (2013.01)

(58) Field of Classification Search
CPC ..... G06F 13/385; G06F 9/3861; G06F 13/24; G06F 9/526; H04L 45/245; H04L 45/122; H04L 45/00; H04L 49/90; H04L 69/04; H04L 69/22; H04L 69/161; Y02B 60/33
See application file for complete search history.

(56) References Cited

U.S. PATENT DOCUMENTS

| 8,488,601 | B1 * | 7/2013 | Wadekar | ............... H04L 45/245 370/389 |
| 2009/0007150 | A1 * | 1/2009 | Li | ........................... G06F 13/24 719/321 |
| 2009/0031070 | A1 | 1/2009 | Purcell et al. | |
| 2009/0161547 | A1 | 6/2009 | Riddle et al. | |
| 2009/0319705 | A1 | 12/2009 | Foong et al. | |

FOREIGN PATENT DOCUMENTS

WO    2013/077860 A1    5/2013

OTHER PUBLICATIONS

International Preliminary Report on Patentability and Written Opinion received for PCT Patent Application No. PCT/US2011/061876, mailed on Jun. 5, 2014, 6 pages.

(Continued)

*Primary Examiner* — Alpus H Hsu
*Assistant Examiner* — Dharmesh Patel
(74) *Attorney, Agent, or Firm* — Christopher K. Gagne

(57) ABSTRACT

An embodiment may include circuitry that may be capable of selecting, from network devices, at least one network device to which at least one packet is to be transmitted. The network devices may be associated, at least in part, with each other in at least one link aggregation. The circuitry may select the at least one network device based at least in part upon a relative degree of affinity that the at least one network device may have with respect to at least one central processing unit (CPU) socket that may be associated, at least in part, with at least one flow to which the at least one packet may belong. The relative degree of affinity may be relative to respective degrees of affinity that one or more others of the network devices may have with respect to the at least one CPU socket. Many modifications are possible.

21 Claims, 2 Drawing Sheets

(56) References Cited

OTHER PUBLICATIONS

International Search Report and Written Opinion received for PCT Patent Application No. PCT/US2011/61876, mailed on Jul. 30, 2012, 9 pages.

Link aggregation, Wikipedia, the free encyclopedia, retrieved from http://en.wikipedia.org/wiki/Link_aggregation on Jun. 10, 2011, pp. 1-5.

Amendment to Carrier Sense Multiple Access with Collision Detection (CSMA/CD) Access Method and Physical Layer Specifications—Aggregation of Multiple Link Segments, Sponsor LAN MAN Standards Committee of the IEEE Computer Society, Approved Mar. 30, 2000, IEEE-SA Standards Board 802.3ad-2000, 183 pages.

IEEE Standard for Local and metropolitan area networks—Link Aggregation, IEEE Computer Society, Sponsored by the LAN/MAN Standards Committee, IEEE Std 802.1AX™-2008, 163 pages.

Office Action dated Jan. 27, 2016 in Chinese Patent Application No. 201180074968.3 (6 pages, with 8 psges summarized organized English translation).

\* cited by examiner

NETWORK DEVICE SELECTION

FIELD

This disclosure relates to network device selection.

BACKGROUND

One conventional computer includes central processing units (CPU) that are included in CPU sockets. Each CPU includes one or more processor cores. The conventional computer operates in accordance with a non-uniform memory architecture in which memory that can be accessed by a respective CPU or socket can be classified as either local memory or remote memory with respect to that CPU or socket, depending upon whether the memory is local to or remote from the socket the comprises that CPU. A local memory access may involve relatively less latency than a remote memory access.

The conventional computer also includes teamed network interface controllers that provide aggregated links to a network to which the links are coupled. In a manner analogous to memory access in non-uniform memory architecture, an individual network interface controller in a team can be either local to or remote from a socket or CPU. Data transmission to or from a socket or CPU via a local network interface controller may be relatively more efficient and/or involve relatively less latency than via a remote network interface controller.

In this conventional computer, the determination of which of the teamed network interface controllers is to be used by a socket or CPU typically is made without regard to such locality issues, and/or is based upon fixed, pre-determined assignments that arise out of the conventional computer's physical configuration that do not take into consideration the characteristics of actual communication exchanges that are taking place. In either case, this may reduce network communication efficiency and/or increase network communication processing latency.

BRIEF DESCRIPTION OF THE SEVERAL VIEWS OF THE DRAWINGS

Features and advantages of embodiments wilt become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
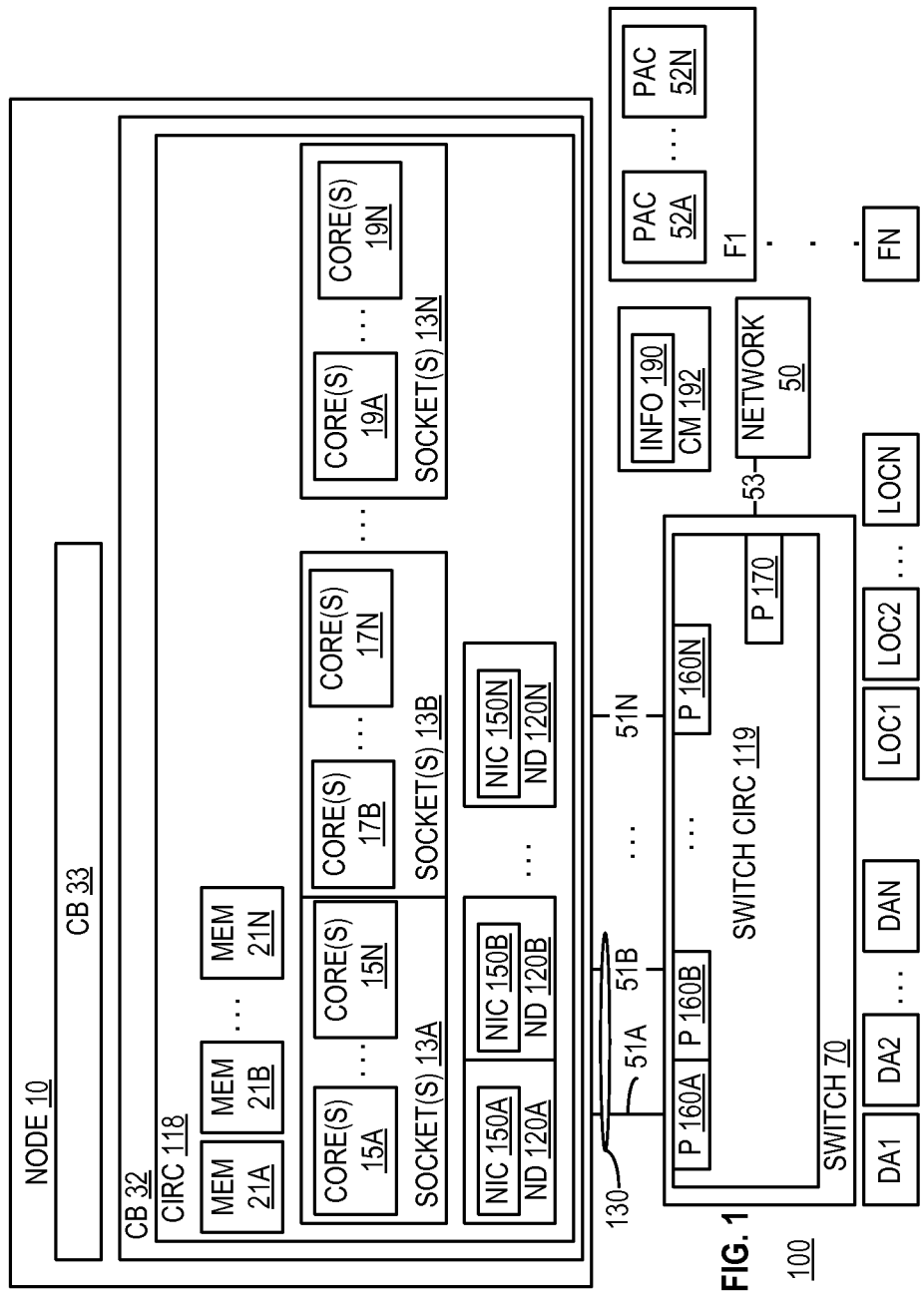
FIG. 1 illustrates a system embodiment.

FIG. 1 illustrates a system embodiment 100. System 100 may include one or more nodes 10. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

One or more nodes 10 may comprise one or more (and in this embodiment, a plurality of) circuit boards (CB) 32 and/or 33. Circuit boards 32 and/or 33 may each be or comprise one or more motherboards, circuit cards, blades, and/or circuit panels that may be electrically and/or mechanically coupled to each other (e.g., via one or more not shown rack mounting and/or other coupling systems) so as to be communicatively coupled, at least in part, with each other.

Circuit board 32 may comprise circuitry 118. Circuitry 118 may comprise, at least in part, one or more central processing unit (CPU) sockets 13A, 13B, . . . 13N, computer readable/writable memories 21A, 21B, . . . 21N, and/or network devices (ND) 120A, 120B, . . . 120N. Although not shown in the Figures, circuit board 32 also may comprise interconnect circuitry (e.g., comprising memory and/or I/O controller circuitry) that may communicatively couple the sockets 13A, 13B, . . . 13N to and/or among each other. This not shown interconnect circuitry also may respectively communicatively couple the sockets 13A, 13B, . . . 13N to respective memories 21A, 21B, . . . 21N in accordance with a non-uniform memory access (NUMA) architecture. This may permit the sockets 13A . . . 13N to access the memories 21A . . . 21N in accordance, at least in part, with NUMA. For example, in this embodiment, one or more memories 21A may be respective local memory with respect to one or more sockets 13A, but the others of the memories (e.g., other than one or more memories 21A) may be remote with respect to one or more sockets 13A. Also for example, one or more memories 21B may be respective local memory with respect to one or more sockets 13B, but the others of the memories (e.g., other than one or more memories 21B) may be remote with respect to one or more sockets 13B. Also for example, and/or one or more memories 21N may be respective local memory with respect to one or more sockets 13N, but the others of the memories (e.g., other than one or more memories 21N) may be remote with respect to one or more sockets 13N.

In this embodiment, in a manner that may be analogous (at least in part) to the manner in which NUMA architecture may be implemented, the not shown interconnect circuitry may communicatively couple the sockets 13A . . . 13N to respective network devices 120A . . . 120N in such a way as to permit the respective network devices 120A . . . 120N to be respectively local with respect to at least certain of the respective sockets 13A . . . 13N, but to be respectively remote with respect to at least certain others of the respective sockets 13A . . . 13N. For example, in this embodiment, one or more network devices 120A may be respective local network devices with respect to one or more sockets 13A, but the others of the network devices (e.g., other than one or more network devices 120A) may be remote with respect to one or more sockets 13A. Also for example, one or more network devices 120B may be respective local network devices with respect to one or more sockets 13B, but the others of the network devices (e.g., other than one or more network devices 120B) may be remote with respect to one or more sockets 13B. Also for example, one or more network devices 120N may be respective local network devices with respect to one or more sockets 13N, but the others of the network devices (e.g., other than one or more network devices 120N) may be remote with respect to one or more sockets 13N.

Each of the sockets 13A . . . 13N may comprise a respective plurality of processor cores. For example, one or more sockets 13A may comprise a plurality of processor cores 15A ... 15N. One or more sockets 13B may comprise a plurality of processor cores 17A ... 17N. One or more sockets 13N may comprise a plurality of processor cores 19A ... 19N.

Each of the network devices 120A ... 120N may be or comprise one or more respective network interface controllers (NIC). For example, one or more network devices 120A may comprise one or more NIC 150A. One or more network devices 120B may comprise one or more NIC 150B. One or more network devices 120N may comprise one or more NIC 150N. The not shown interconnect circuitry may communicatively couple the respective NIC 150A ... 150N to the respective sockets 13A ... 13N.

In this embodiment, network devices 120A ... 120N and/or NIC 150A ... 150N may be communicatively coupled to one or more switches 70 via communication links 51A ... 51N. These links 51A ... 51N may be coupled to ports 160A ... 160N of switch circuitry 119 that may be comprised in one or more switches 70. For example, one or more network devices 120A and/or one or more NIC 150A may be communicatively coupled via one or more links 51A to one or more ports 160A. One or more network devices 120B and/or one or more NIC 150B may be communicatively coupled via one or more links 51B to one or more ports 160B. One or more network devices 120N and/or one or more NIC 150N may be communicatively coupled via one or more links 51N to one or more ports 160N. Switch circuitry 119 also may comprise one or more ports 170 that may be communicatively coupled via one more communication links 53 to one or more networks 50.

In this embodiment, a plurality of the network devices 120A ... 120N and/or NIC 150A ... 150N may be associated, at least in part, with or among each other in one or more link aggregations. For example, network devices 120A and 120B and/or NIC 150A and 150B may be associated, at least in part, with each other in one or more link aggregations 130 that may comprise and/or involve, at least in part, links 51A and 51B.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, CPU, processor core, core, and controller each may comprise respective circuitry capable of performing, at least in part, one or more arithmetic and/or logical operations, and/or of executing, at least in part, one or more instructions. Although not shown in the Figures, one or more nodes 10 and/or one or more switches 70 each may comprise a respective graphical user interface system that may comprise, e.g., a respective keyboard, pointing device, and display system that may permit a human user to input commands to, and monitor the operation of one or more nodes 10, one or more switches 70, and/or system 100.

Figure 2:
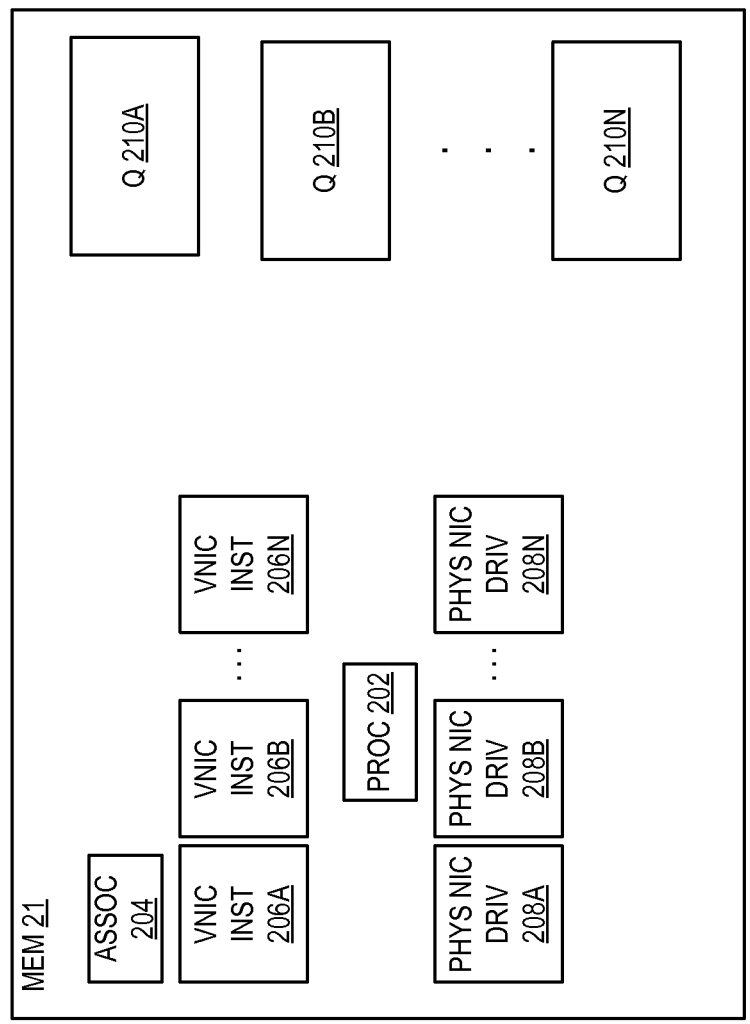
FIG. 2 illustrates features in an embodiment.

Memories 21A ... 21N may be collectively or singly referred to (e.g., depending upon the particular context) herein as memory 21 (see FIG. 2). Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

One or more machine-readable program instructions may be stored in memory 21. In operation of one or more nodes 10, these instructions may be accessed and executed by circuitry 118 and/or one or more of the processor cores 15A ... 15N, 17A ... 17N, and/or 19A ... 19N. When so accessed and executed, these one or more instructions may result in one or more network device/NIC teaming/aggregation processes 202, virtual NIC instance processes 206A ... 206N, physical NIC driver instance processes 208A ... 208N being executed at least in part by circuitry 118 and/or one or more of the processor cores 15A ... 15N, 17A ... 17N, and/or 19A ... 19N, and becoming resident at least in part in memory 21. Also when so accessed and executed, these one or more instructions may result in circuitry 118, processor cores 15A ... 15N, 17A ... 17N, and/or 19A ... 19N, network devices 120A ... 120N, NIC 150A ... 150N, and/or one or more components thereof, performing operations described herein as being performed by these components of system 100.

In this embodiment, a portion or subset of an entity may comprise all or less than all of the entity. Also, in this embodiment, a process, daemon, program, driver, operating system, application, kernel, virtual machine monitor, and/or instance thereof each may (1) comprise, at least in part, and/or (2) result, at least in part, in and/or from, execution of one or more operations and/or program instructions.

In this embodiment, as a result at least in part of the particular construction and/or configuration of circuitry 118, sockets 13A ... 13N, memories 21A ... 21N, network devices 120A ... 120N, NIC 150A ... 150N, and/or the not shown interconnect circuitry, with respect to a respective processor core and/or the respective socket that comprises the respective processor core, a respective local memory, respective local network device, and/or respective local NIC may be more closely coupled to and/or associated with the respective processor core and/or the respective socket than is the case for a respective remote memory, remote network device, and/or remote NIC. Additionally or alternatively, a respective socket and/or a respective processor core comprised in the respective socket may be capable of accessing and/or communicating with, at least in part, a respective local memory, local network device, and/or local NIC faster (e.g., with reduced latency relative to) than a respective remote memory, remote network device, and/or remote NIC. Further additionally or alternatively, architectures and/or techniques other than and/or in addition to non-uniform memory access architecture and/or analogous/similar techniques may be employed and/or embodied, at least in part, in one or more nodes 10 and/or circuitry 118 without departing from this embodiment. As a result, at least in part, of the foregoing, data transmission to or from a respective socket or respective processor core comprised in the respective socket via a respective local network device and/or respective local NIC may be relatively more efficient and/or involve relatively less latency than via a respective remote network device and/or remote NIC.

In this embodiment, a network, network link, and/or communication link may be or comprise any mechanism, instrumentality, modality, and/or portion thereof that may permit, facilitate, and/or allow, at least in part, two or more entities to be communicatively coupled together, such as, for example, using and/or via one or more wired and/or wireless networks. Also in this embodiment, a first entity may be "communicatively coupled" to a second entity if the first entity is capable of transmitting to and/or receiving from the second entity one or more commands and/or data. In this embodiment, a "wireless network" may be or comprise a network that permits, at least in part, at least two entities to be wirelessly communicatively coupled, at least in part. In this embodiment, a "wired network" may be or comprise a network that permits, at least in part, at least two entities to be communicatively coupled, at least in part, non-wirelessly.

In this embodiment, a packet may comprise one or more symbols and/or values. Also in this embodiment, a flow and/or packet flow may be, comprise, and/or be associated with, at least in part, a plurality of packets that belong to, are associated with, and/or share, at least in part, one or more features, sources, destinations, properties, characteristics, symbols, and/or values, such as, for example, one or more common source and/or destination addresses, protocol (e.g., transmission control protocol) ports, services, processes, recipients, and/or origins, and/or one or more sockets and/or processor cores involved in processing and/or intended to process, at least in part, the packets.

Also in this embodiment, a switch may be or comprise one or more intermediate stations capable, at least in part, of forwarding and/or routing one or more packets. In this embodiment, a network device may be or comprise circuitry that is capable of being used in, comprised in, and/or being communicatively coupled to (directly or indirectly) one or more networks. Additionally, in this embodiment, a CPU socket may be or comprise circuitry that comprises and/or is capable of being communicatively coupled to, at least in part, a plurality of processor cores.

Additionally, in this embodiment, the teaming of two or more devices may be, comprise, facilitate, result in and/or from, and/or involve, at least in part, the association, using together, and/or combining of respective physical and/or logical features, capabilities, operations, and/or circuitry of the devices, at least in part. In this embodiment, link aggregation may be, comprise, facilitate, result in and/or from, and/or involve, at least in part, teaming of two or more communication links. In this embodiment, link aggregation may permit throughput improvement and/or increased redundancy capabilities compared to that which might otherwise result if the links in the link aggregation were not to be so aggregated.

In this embodiment, the teaming of network devices 120A and 120B, the teaming of NIC 150A and 105B, and/or the aggregation of links 51A and 51B may comply and/or be compatible with, at least in part, the protocols described in Institute of Electrical and Electronics Engineers (IEEE) Std 802.ad-2000 and/or IEEE Std 802.1AX-2008. Also in this embodiment, network devices 120A . . . 120N and/or NIC 150A . . . 150N may exchange data and/or commands with ports 160A . . . 160N via links 51A . . . 51N in accordance with one or more communication protocols. Likewise, one or more ports 170 may exchange data and/or commands with one or more networks 50 via one or more links 53 in accordance with one or more such protocols. For example, in this embodiment, these one or more protocols may be compatible with, at least in part, e.g., one or more Ethernet, Transmission Control Protocol/Internet Protocol (TCP/IP), and/or other protocols.

For example, one or more Ethernet protocols that may be utilized in system 100 may comply or be compatible with, at least in part, IEEE Std 802.3-2008, Dec. 26, 2008; IEEE Std 802.1Q-2005, May 19, 2006; IEEE Std 802.11a-1999, Feb. 11, 1999; IEEE Std 802.11b-1999, Feb. 11, 1999; IEEE Std 802.11g-2003, Oct. 20, 2003; and/or IEEE Std 802.11n-2009, Oct. 29, 2009. The TCP/IP protocol that may be utilized in system 100 may comply or be compatible with, at least in part, the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

In operation of system 100, the execution, at least in part, of one or more processes 202 may result, at least in part, in circuitry 118 and/or one or more of the processor cores 15A . . . 15N, 17A . . . 17N, and/or 19A . . . 19N selecting, at least in part, from (e.g., among network devices 120A . . . 120N) one or more network devices (e.g., one or more network devices 120A) to which one or more packets 52A are to be transmitted. For example, one or more packets 52A may be generated, at least in part, by one or more processor cores (e.g., one or more cores 15A). One or more processes 202, circuitry 118, and/or one or more of the processor cores 15A . . . 15N, 17A . . . 17N, and/or 19A . . . 19N may select one or more network devices 120A based at least in part upon a relative degree of affinity (e.g., DA1 in FIG. 1) that one or more network devices 120A may have with respect to one or more CPU sockets (in this example, one or more sockets 13A) that are associated, at least in part, with one or more packet flows (e.g., one or more packet flows F1) to which the one or more packets 52A may belong, at least in part.

For example, in this embodiment, the packets 52A . . . 52N that may belong to, at least in part, one or more flows F1 (and accordingly, one or more flows F1 themselves) may be generated, at least in part, by one or more cores 15A. In this example, one or more cores 15A may be comprised in one or more sockets 13A, and accordingly, one or sockets 13A may be associated, at least in part, with one or more flows F1 and/or one or more packets 52A. In this example, the relative degree of affinity DA1 that one or more devices 120A may have with respect to one or more sockets 13A may be relative to respective degrees of affinity (e.g., DA2 . . . DAN) that the one or more other network devices 120B . . . 120N may have with respect to the one or more sockets 13A. This relative degree of affinity DA1 may be determined, based at least in part upon relative locality of communication coupling (e.g., LOC1 in FIG. 1) of the one or more devices 120A to the one or more sockets 13A. Relative locality of communication coupling LOC1 may be relative to respective localities of communicative coupling (e.g., LOC2 . . . LOCN) of the one or more other network devices 120B . . . 120N to the one or more sockets 13A.

In this embodiment, the relative degree of affinity of a respective network device to a respective CPU socket may be, comprise, result from, and/or correspond to, at least in part, the degree to which the respective network device may be considered to be local to the respective CPU socket, e.g., relative to the respective degrees that other respective network devices may be considered to be local to the respective CPU socket. Also in this embodiment, the relative locality of communicative coupling of a respective network device to a respective CPU socket may be, comprise, result from, and/or correspond to, at least in part, the relative efficiency and/or relative latency of data transmission to or from the respective socket via the respective local network device (e.g., as a result, at least in part, of the particular configuration of the not shown interconnect circuitry).

For example, in this embodiment, as a result, at least in part, of the particular configuration of the not shown interconnect circuitry, the relative degree of affinity DA1 may be greater than any of the other relative degrees of affinity DA2 . . . DAN, and/or the relative locality of communicative coupling LOC1 may be greater than any of the other relative localities of communicative coupling LOC2 . . . LOCN. One or more processes 202, circuitry 118, and/or one or more of the processor cores 15A . . . 15N, 17A . . . 17N, and/or 19A . . . 19N may select the one or more network devices 120A to which the one or more packets 52A are to be transmitted such that (1) the one or more selected network devices 120A may have the greatest relative degree of affinity DA1 and/or (2) the greatest relative locality of communicative coupling LOC1 to the one or more sockets 13A associated, at least in part, with the one or more flows F1 to which the one or more packets 52A may belong.

For example, one or more processes 202 shown in FIG. 2 may generate, at least in part, one or more associations 204 that may be stored, at least in part, in memory 21. In this embodiment, an association may be or comprise one or more data structures, such as, for example, one or more tables and/or databases. One or more associations 204 may associate, at least in part, the virtual NIC instances 206A . . . 206N with the physical NIC driver instances 208A . . . 208N, the sockets 13A . . . 13N, and/or the respective processor cores comprised in the sockets 13A . . . 13N. The one or more associations 204 may comprise, be based upon, and/or reflect, at least in part, the degrees of affinity DA1 . . . DAN and/or the localities of communicative coupling LOC1 . . . LOCN.

For example, in this embodiment, each of the respective network devices 120A . . . 120N and/or NIC 150A . . . 150N may be associated with and/or controlled, at least in part, by a respective one of the physical NIC driver instances 208A . . . 208N. That is, each of the network devices 120A . . . 120N and/or each of the NIC 150A . . . 105N may be or comprise a respective physical device that may be associated with and/or controlled by, a respective one of the physical NIC driver instances 208A . . . 208N (e.g., in respective 1 to 1 relationships). However, in this embodiment, each of the VNIC instances 206A . . . 206N may comprise a respective multiplicity of VNIC instances that may be associated with and/or used by respective of the sockets 13A . . . 13N. For example, the respective sets of processor cores in the respective sockets 13A . . . 13N may execute multiple respective processes (not shown) that may generate, at least in part, packets in packet flows (e.g., packet flows F1 . . . FN) to be transmitted from one or more nodes 10 to network 50 via switch 70. For each respective CPU socket, in order to initiate packet transmission from one or more nodes 10, these not shown processes executed by the processor cores in the respective socket may access and/or issue (e.g., via one or more not shown operating system network stack processes) to associated ones of the VNIC instances the packets to be transmitted.

The one or more associations 204 may assign, correlate, and/or map, at least in part, each respective CPU socket 13A . . . 13N to and/or in a respective tuple (not shown) that may include (1) one or more respective network devices and/or one or more respective NIC having the greatest relative degree of affinity and/or the greatest relative locality of communicative coupling to the respective CPU socket, (2) the respective physical NIC driver instance that is associated with the respective CPU socket, and/or (3) the respective multiple VNIC instances associated with the respective CPU socket. The respective tuple also may indicate one or more respective flows to be directed to the respective CPU socket (e.g., as a consumer) or being generated by the respective CPU socket (e.g., as a producer). Each such respective CPU socket also may include respective memory controller circuitry that also may be indicated in the respective tuple. Thus, in each of these not shown tuples in one or more associations 204, multiple respective VNIC instances may be associated with single respective physical NIC driver instances.

In this embodiment, one or more processes 202 may expose, at least in part, the VNIC instances 206A . . . 206N to the CPU sockets 13A . . . 13N with which they may be associated. However, one or more processes 202 may hide, at least in part, the physical NIC driver instances 208A . . . 208N from these sockets 13A . . . 13N. Each of these VNIC instances 206A . . . 206N may expose single respective queues (and/or sets of queues and/or queue pairs) 210A . . . 210N to each of the respective sockets 13A . . . 13N that may be associated with the VNIC instances 206A . . . 206N.

After a packet (e.g., packet 52A) is received by one of the VNIC instances VNIC instance 206A), the VNIC instance 206A and/or one or more processes 202 may select, based at least in part upon the tuples in the one or more associations 204, the physical NIC driver instance (e.g., instance 208A) associated with the network device 120A and/or NIC 150A that may have the greatest relative degree of affinity and/or the greatest relative locality of communicative coupling to the respective CPU socket (e.g., socket 13A) that generated the packet 52A and/or flow F1 to which the packet 52A belongs. In effect, this also may select the network device 120A and/or NIC 150A. Circuitry 118, one or more of the processor cores 15A . . . 15N, 17A . . . 17N, and 19A . . . 19N, VNIC instance 206A, and/or one or more processes 202 may transmit the packet 52A to the thus selected physical NIC driver instance 208A for processing. Physical NIC driver instance 208 then may control the operation of its associated network device 120A and/or NIC 150A such that the network device 120A and/or NIC 150A may transmit the packet 52A via one or more links 51A to port 160A of switch 70. Switch 70 may transmit the packet 52A via one or more ports 170 and one or more links 53 to one or more networks 50. In the above example, the one or more not shown operating system network stack processes may use local memory (e.g., memory 21A) to one or more sockets 13A to buffer the packet 52A.

Additionally or alternatively, although not shown specifically in the Figures, the one or more of the network devices 120A . . . 120N that may be selected in accordance, at least in part, with the above techniques of this embodiment, may be or comprise, at least in part, one or more of the ports 160A . . . 160N of switch 70. For purposes of this example, each of the flows F1 . . . FN may be received by the switch 70 from the network 50, and may be intended to be consumed (e.g., processed) by one or more respective processor cores in respective of the sockets 13A . . . 13N. For example, the packets comprised in flow F1 may be intended to be consumed by one or more of the processor cores 15A . . . 15N in one or more sockets 13A, and the packets comprised in flow FN may be intended to be consumed by one or more of the processor cores 17A . . . 17N in one or more sockets 13B. Switch 70 and/or switch circuitry 119 may select one or more ports 160A via, which to transmit one or more packets 52A of flow F1 to one or more nodes 10 based at least in part upon information 190 provided, at least in part, to switch 70 from one or more nodes 10 via, one or more control messages 192. Switch 70 and/or switch circuitry 119 also may select one or more ports 160B via which to transmit the packets in flow FN to one or more nodes 10 based at least in part upon information 190.

For example, one or more control messages 192 may comprise information 190 and may be generated, at least in part, by one or more processes 202. One or more processes 202 may generate, at least in part, one or more control messages 192 and/or information 190 based at least in part upon one or more associations 204. The information 190 and/or one or more control messages 192 may implicitly and/or explicitly contain, provide, and/or indicate, at least in part, the respective tuple information comprised in one or more associations 204. This tuple information provided to switch 70 and/or switch circuitry 119 may permit the switch 70 and/or switch circuitry 119 to determine, at least in part, for each respective CPU socket 13A . . . 13N, one or more respective flows that are being produced or intended to be consumed by the respective CPU socket, and/or the one or more respective NIC having the greatest relative degree of affinity and/or the greatest relative locality of communicative coupling to the respective CPU socket. Based upon this tuple information and other packet information (e.g., source/destination address, port information, etc.) obtained from packets transmitted to switch 70 from one or more nodes 119, switch 70 and/or switch circuitry 119 may select the one or more ports 160A of switch 70 to and/or via which to transmit the packets 52A . . . 52N in flow F1. Switch 70 and/or switch circuitry 119 may make this selection because one or more ports 160A may be communicatively coupled (e.g., in the most direct and/or close manner for any component of switch 70) to the one or more NIC 150A that may have the greatest relative degree of affinity DA1 and/or the greatest relative locality of communicative coupling LOC1 to the socket 13A.

Also based upon this tuple information and other packet information, switch 70 and/or switch circuitry 119 may select the one or more ports 160B of switch 70 to and/or via which to transmit the packets in flow FN. Switch 70 and/or switch circuitry 119 may make this selection because one or more ports 160B may be communicatively coupled (e.g., in the most direct and/or close manner for any component of switch 70) to the one or more NIC 150B that may have the greatest relative degree of affinity and/or the greatest relative locality of communicative coupling to the socket 13B.

Thus, an embodiment may include circuitry to select, from network devices, at least one network device to which at least one packet is to be transmitted. The network devices may be associated, at least in part, with each other in at least one link aggregation. The circuitry may select the at least one network device based at least in part upon a relative degree of affinity that the at least one network device has with respect to at least one CPU socket that is associated, at least in part, with at least one flow to which the at least one packet belongs. The relative degree of affinity may be relative to respective degrees of affinity that one or more others of the network devices have with respect to the at least one CPU socket.

Advantageously, in this embodiment, the selection of the one or more network devices to which to transmit packets may be made on per packet and/or per flow basis, based at least in part upon which flows the packets may belong to, the CPU sockets most closely associated with those flows, the relative affinities of the CPU sockets to the network devices, and/or the relative localities of communicative coupling of the CPU sockets to the network devices. Advantageously, this may improve network communication efficiency and/or decrease network communication processing latency in one or more nodes 10 and/or system 100.

Many modifications are possible. For example, one or more, processes 202 may generate one or more associations 204 based at least in part upon one or more user-provided preferences (e.g., provided via the one or more not shown graphical user interfaces). These preferences may modify (e.g., dynamically during run time), at least in part, the one or more associations 204 to take into consideration, for example, load balancing, relative processing speed, and/or other preferences between or among the VNIC instances, CPU sockets, network interface controllers, network devices, etc. Many other modifications are also possible. Accordingly, this embodiment should be viewed broadly as encompassing all such alternatives, modifications, and alternatives.

What is claimed is:

1. An apparatus comprising:
   circuitry to select, from network devices, at least one network device to which at least one packet is to be transmitted, the network devices being associated, at least in part, with each other in at least one link aggregation, the circuitry to select the at least one network device based at least in part upon a relative degree of affinity that the at least one network device has with respect to at least one central processing unit (CPU) socket that is associated, at least in part, with at least one flow to which the at least one packet belongs, the relative degree of affinity being relative to respective degrees of affinity that one or more others of the network devices have with respect to the at least one CPU socket, the relative degree of affinity being determined, based at least in part, upon relative locality of communicative coupling of the at least one network device to the at least one CPU socket relative to respective localities of communicative coupling of the one or more others of the network devices to the at least one CPU socket, the relative locality of communicative coupling being determined, based at least in part, upon at least one of relative efficiency and relative latency of data transmission to or from the at least one CPU socket via the at least one network device relative to at least one of respective efficiencies and respective latencies of other data transmissions to or from the at least one CPU socket via the one or more others of the network devices.

2. The apparatus of claim 1, wherein:
   each of the network devices comprises a respective network interface controller (NIC).

3. The apparatus of claim 1, wherein:
   the apparatus comprises a node that comprises a circuit board;
   the circuit board comprises:
   the circuitry;
   CPU sockets that comprise the at least one CPU socket; and
   the network devices;
   each of the CPU sockets comprises a respective plurality of processor cores;
   the network devices comprise respective network interface controllers;
   the CPU sockets are respectively coupled to respective network interface controllers; and
   the network interface controllers are respectively coupled to respective ports of a switch.

4. The apparatus of claim 1, wherein:
   the circuitry is to execute, at least in part, at least one process that is to generate, at least in part, at least one association;
   the at least one association is to associate virtual network interface controller (NIC) instances, physical NIC driver instances, and CPU sockets;
   the CPU sockets comprise the at least one CPU socket; and
   the at least one association reflects, at least in part, the relative degree of affinity and the respective degrees of affinity.

5. The apparatus of claim 4, wherein:
   the at least one association is to associate multiple of the virtual NIC instances with a single one of the physical NIC driver instances;
   the at least one process is to expose the virtual NIC instances to the CPU sockets;
   the at least one process is to hide the physical NIC driver instances from the CPU sockets; and
   each of the virtual NIC instances is to expose a single respective queue to each respective CPU socket.

6. The apparatus of claim 1, wherein:
the network devices comprise ports coupled to a node that comprises CPU sockets that include the at least one CPU socket;
a switch comprises the ports; and
the switch is to select at least one of the ports via which to transmit the at least one packet to the node based at least in part upon information from the node, the relative degree of affinity being determinable, at least in part, based at least in part upon the information.

7. The apparatus of claim 6, wherein:
the information is provided, at least in part, via one or more control messages issued from the node to the switch; and
the CPU sockets are to access memory in accordance, at least in part, with non-uniform memory access.

8. A method comprising:
selecting, at least in part by circuitry, from network devices at least one network device to which at least one packet is to be transmitted, the network devices being associated, at least in part, with each other in at least one link aggregation, the circuitry to select the at least one network device based at least in part upon a relative degree of affinity that the at least one network device has with respect to at least one central processing unit (CPU) socket that is associated, at least in part, with at least one flow to which the at least one packet belongs, the relative degree of affinity being relative to respective degrees of affinity that one or more others of the network devices have with respect to the at least one CPU socket, the relative degree of affinity being determined, based at least in part, upon relative locality of communicative coupling of the at least one network device to the at least one CPU socket relative to respective localities of communicative coupling of the one or more others of the network devices to the at least one CPU socket, the relative locality of communicative coupling being determined, based at least in part, upon at least one of relative efficiency and relative latency of data transmission to or from the at least one CPU socket via the at least one network device relative to at least one of respective efficiencies and respective latencies of other data transmissions to or from the at least one CPU socket via the one or more others of the network devices.

9. The method of claim 8, wherein:
each of the network devices comprises a respective network interface controller (NIC).

10. The method of claim 8, wherein:
the apparatus comprises a node that comprises a circuit board;
the circuit board comprises:
  the circuitry;
  CPU sockets that comprise the at least one CPU socket; and
  the network devices;
each of the CPU sockets comprises a respective plurality of processor cores;
the network devices comprise respective network interface controllers;
the CPU sockets are respectively coupled to respective network interface controllers; and
the network interface controllers are respectively coupled to respective ports of a switch.

11. The method of claim 8, wherein:
the circuitry is to execute, at least in part, at least one process that is to generate, at least in part, at least one association;
the at least one association is to associate virtual network interface controller (NIC) instances, physical NIC driver instances, and CPU sockets;
the CPU sockets comprise the at least one CPU socket; and
the at least one association reflects, at least in part, the relative degree of affinity and the respective degrees of affinity.

12. The method of claim 11, wherein:
the at least one association is to associate multiple of the virtual NIC instances with a single one of the physical NIC driver instances;
the at least one process is to expose the virtual NIC instances to the CPU sockets;
the at least one process is to hide the physical NIC driver instances from the CPU sockets; and
each of the virtual NIC instances is to expose a single respective queue to each respective CPU socket.

13. The method of claim 8, wherein:
the network devices comprise ports coupled to a node that comprises CPU sockets that include the at least one CPU socket;
a switch comprises the ports; and
the switch is to select at least one of the ports via which to transmit the at least one packet to the node based at least in part upon information from the node, the relative degree of affinity being determinable, at least in part, based at least in part upon the information.

14. The method of claim 13, wherein:
the information is provided, at least in part, via one or more control messages issued from the node to the switch; and
the CPU sockets are to access memory in accordance, at least in part, with non-uniform memory access.

15. Non-transitory computer-readable memory storing one or more instructions that when executed by a machine result in performance of operations comprising:
selecting, at least in part by circuitry, from network devices at least one network device to which at least one packet is to be transmitted, the network devices being associated, at least in part, with each other in at least one link aggregation, the circuitry to select the at least one network device based at least in part upon a relative degree of affinity that the at least one network device has with respect to at least one central processing unit (CPU) socket that is associated, at least in part, with at least one flow to which the at least one packet belongs, the relative degree of affinity being relative to respective degrees of affinity that one or more others of the network devices have with respect to the at least one CPU socket, the relative degree of affinity being determined, based at least in part, upon relative locality of communicative coupling of the at least one network device to the at least one CPU socket relative to respective localities of communicative coupling of the one or more others of the network devices to the at least one CPU socket, the relative locality of communicative coupling being determined, based at least in part, upon at least one of relative efficiency and relative latency of data transmission to or from the at least one CPU socket via the at least one network device relative to at least one of respective efficiencies and respective latencies of other data transmissions to or from the at least one CPU socket via the one or more others of the network devices.

16. The non-transitory computer-readable memory of claim 15, wherein:
each of the network devices comprises a respective network interface controller (NIC).

17. The non-transitory computer-readable memory of claim 15, wherein:
- the circuitry is comprised in a circuit board that is comprised in a node;
- the circuit board comprises:
  - the circuitry;
  - CPU sockets that comprise the at least one CPU socket; and
  - the network devices;
- each of the CPU sockets comprises a respective plurality of processor cores;
- the network devices comprise respective network interface controllers;
- the CPU sockets are respectively coupled to respective network interface controllers; and
- the network interface controllers are respectively coupled to respective ports of a switch.

18. The non-transitory computer-readable memory of claim 15, wherein:
- the circuitry is to execute, at least in part, at least one process that is to generate, at least in part, at least one association;
- the at least one association is to associate virtual network interface controller (NIC) instances, physical NIC driver instances, and CPU sockets;
- the CPU sockets comprise the at least one CPU socket; and
- the at least one association reflects, at least in part, the relative degree of affinity and the respective degrees of affinity.

19. The non-transitory computer-readable memory of claim 18, wherein:
- the at least one association is to associate multiple of the virtual NIC instances with a single one of the physical NIC driver instances;
- the at least one process is to expose the virtual NIC instances to the CPU sockets;
- the at least one process is to hide the physical NIC driver instances from the CPU sockets; and
- each of the virtual NIC instances is to expose a single respective queue to each respective CPU socket.

20. The non-transitory computer-readable memory of claim 15, wherein:
- the network devices comprise ports coupled to a node that comprises CPU sockets that include the at least one CPU socket;
- a switch comprises the ports; and
- the switch is to select at least one of the ports via which to transmit the at least one packet to the node based at least in part upon information from the node, the relative degree of affinity being determinable, at least in part, based at least in part upon the information.

21. The non-transitory computer-readable memory of claim 20, wherein:
- the information is provided, at least in part, via one or more control messages issued from the node to the switch; and
- the CPU sockets are to access memory in accordance, at least in part, with non-uniform memory access.

* * * * *